Sept. 20, 1955 L. W. SCHMIDT 2,718,108
DRIVE MECHANISM FOR TRACTOR-MOUNTED BEET HARVESTERS
Filed Aug. 16, 1954
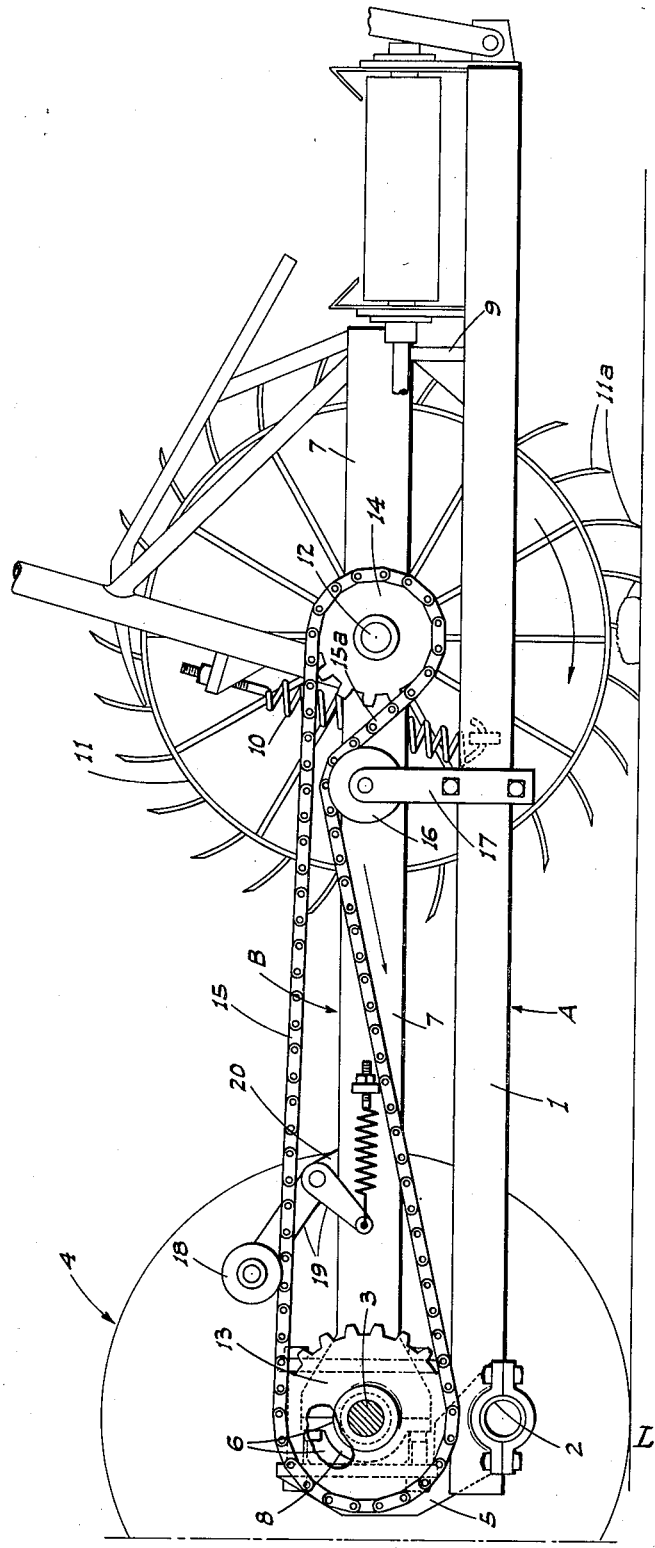
INVENTOR
Lewis W. Schmidt
ATTORNEYS

2,718,108

DRIVE MECHANISM FOR TRACTOR-MOUNTED BEET HARVESTERS

Lewis Wallace Schmidt, Walnut Grove, Calif.

Application August 16, 1954, Serial No. 450,104

3 Claims. (Cl. 55—106)

This invention relates to beet harvesters of the type which are disposed laterally of, and supported from, a wheeled tractor; the present invention being particularly a modification of the structure for driving the spiked, beet pick-up wheel of the harvester, over what is shown in the United States patent of myself and Henry V. Lea, No. 2,637,155, dated May 5, 1953.

In such patent a means is provided, in connection with the driving of the spiked, beet pick-up wheel, to cause the wheel—when encountering excessive resistance—to be automatically lifted sufficient to relieve the hard turning of the wheel and the resultant drag on the tractor.

The principal object of the present invention is to provide a spiked, beet pick-up wheel drive mechanism which accomplishes the same result as above, but in what is believed to be a more effective manner, and so as to have a somewhat more sensitive action.

Still another object of the invention is to provide a practical, reliable, and durable spiked, beet pick-up wheel drive mechanism, and one which will be exceedingly effective for the purpose for which it is designed.

These objects are accomplished by means of such structure and relative arrangement of parts as will fully appear by a perusal of the following specification and claims.

The figure on the drawing is a fragmentary elevation of a beet harvester showing the arrangement of the main and floating frames of the harvester relative to each other and to the rear axle structure of the tractor on which said frames are mounted, and the new driving arrangement for the spiked, beet pick-up wheel of the harvester and which wheel is mounted on the floating frame; the near driving wheel of the tractor being removed.

Referring now more particularly to the drawing, and to the characters of reference marked thereon, the harvester comprises a main frame A which includes a longitudinal frame beam 1 supported at its forward end in the manner disclosed in said patent, and at its rear end from a circular cross shaft 2 disposed directly below the rear driving axle 3 of the tractor 4. The cross shaft is supported on brackets 5 depending from and secured to the axle housing structure 6 of such tractor.

The auxiliary or floating frame B of the harvester includes a longitudinal beam 7 disposed above, and substantially parallel to, beam 1 and turnably mounted at its rear end on the axle 3 or on a circular portion of the axle housing 6, as at 8, so as to be coaxial with the axle as shown.

The beam 7 at its forward end normally rests on a stop 9 upstanding from beam 1; a tension spring 10 connected to beams 1 and 7 yieldably holding the beam 7 against the stop.

A spiked, beet pick-up wheel 11 is fixed on a transverse shaft 12 journaled in beam 7 intermediate its ends, and is driven from axle 3 in the same direction by the following means:

Fixed on axle 3 is a sprocket wheel 13, while a similar but preferably somewhat smaller sprocket wheel 14 is fixed on the shaft 12 in alinement with the wheel 13. And endless chain 15 extends about and connects the sprocket wheels.

The upper run of the chain extends substantially straight between the sprockets, but the lower run is caused to deviate upwardly to an appreciable extent by reason of an idler roller or sprocket 16 disposed somewhat close to the sprocket 14, with its upper edge at a level above the shaft 12 as much as possible as long as the upper and lower runs of the chain at that point clear each other.

The idler 16 is mounted on a bracket 17 clamped on beam 1 for adjustment along the same, so that the angle of that portion 15a of the lower run of the chain which extends between the idler and the sprocket 14 may be altered if desired. In order to maintain the chain as a whole taut under all conditions, an idler roller 18 bears down on the upper run of the chain; the roller being mounted on a spring-urged arm unit 19 supported from the upper floating beam 7, as shown at 20.

In operation, upon forward movement of the tractor, the pick-up wheel 11 rotates in the same direction as the drive axle 3, as will be obvious.

If the wheel 11 tends to resist rotation due to the spikes 11a thereof encountering hard ground for instance, such resistance places a drag on the forward movement of the tractor and causes an excessive tension to be placed on the lower run of the drive chain 15. When this occurs, the depending portion 15a of the lower chain-run exerts an upward pull on sprocket 14, and hence to the beam 7 as well, with a force sufficient to overcome the hold-down action of the spring 10, as well as the weight of the floating frame unit as a whole. As a result, the spiked, beet pick-up wheel and the floating frame B on which the wheel is mounted are swung upwardly about axle 3 as an axis. This of course lifts the spikes 11a out of the ground somewhat and thus effectively relieves the tension on the chain and the drag on the tractor.

This drag-relieving action is of course wholly automatic and occurs without attention on the part of the operator, and assures smooth forward advance of the tractor with the implement.

If it is desired to alter the sensitiveness of the lifting action, it is only necessary to shift the idler 16 along beam 1, so as to vary the angle of chain-run portion 15a relative to a vertical plane.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A beet harvester attachment for a tractor having a wheel-drive axle; said attachment comprising a longitudinal frame mounted on the tractor in a normally immovable position relative thereto, a longitudinal floating frame, means pivoting the floating frame at its rear end on the tractor for swinging movement about an axis parallel to and adjacent that of the axle, a transverse shaft journaled on the floating frame ahead of said axis, a beet pick-up wheel fixed on the shaft to engage the ground, a sprocket fixed on the axle, another sprocket fixed on the shaft, an endless chain extending about and between the sprockets, and an idler engaging the lower run of the chain under the same and supported from the first named frame adjacent said other sprocket at a level relative thereto such that the upper edge of the idler is normally a material distance above the lower edge of said other sprocket so that the portion of the lower run of the chain which extends between said upper edge of the idler and the lower edge of said other sprocket is disposed at an acute angle to a vertical plane whereby upon ground resistance to turning of the pick-up wheel, said portion of the lower chain-run imposes a lifting force on the floating frame tending to swing said frame upwardly about its pivotal axis.

2. An attachment, as in claim 1, with means mounting the idler on the first named frame for adjusting movement toward and from the shaft whereby to alter the angle of said lower chain-run portion relative to a vertical plane.

3. An attachment, as in claim 1, with a spring-urged idler mounted on the floating frame and bearing down on the upper run of the chain.

References Cited in the file of this patent
UNITED STATES PATENTS 2,515,966    Polisena _____ July 18, 1950